// HEAVY DUTY HOSE COUPLING AND METHOD FOR MANUFACTURE OF HOSE-COUPLING COMBINATION

This invention relates to a coupling, a hose and coupling assembly and to a method of forming the same, and particularly relates to the coupling of heavy duty hose having multiple plies of steel reinforcing elements.

Hose and coupling assemblies intended for heavy duty use such as rotary drilling, choke and kill, and motion compensator hoses require reliability of sealing between the hose and the coupling in order to withstand working pressure which may exceed 10,000 psi. In addition, in certain heavy duty applications the hose may be subjected to external end loads which may exceed 120,000 pounds. These end loads may be applied either when the hose is pressurized or not pressurized. Unpressurized is the more severe condition for hose to coupling retention. An example of the latter condition occurs in hose-coupling assemblies used for supplying high pressure water for an underwater trenching platform, called a jetting sled, which uses very high pressure water to blast a pipeline trench in the sea floor. The jetting sled is dragged along the sea floor by large drag cables connected to a surface ship. The jetting hose is also connected to the sled. Slackening of the drag cables may cause the hose to periodically be the main dragging link with the sled. This tremendous end loading may occur when the hose is pressurized or unpressurized. The coupling assembly of this invention is capable of withstanding these end load conditions. The hose, coupling combination of this invention achieves both reliable end seal under substantial working pressure and the ability to withstand very large end loadings either with or without internal working pressure.

DETAILED DESCRIPTION OF THE INVENTION

Figure 1:
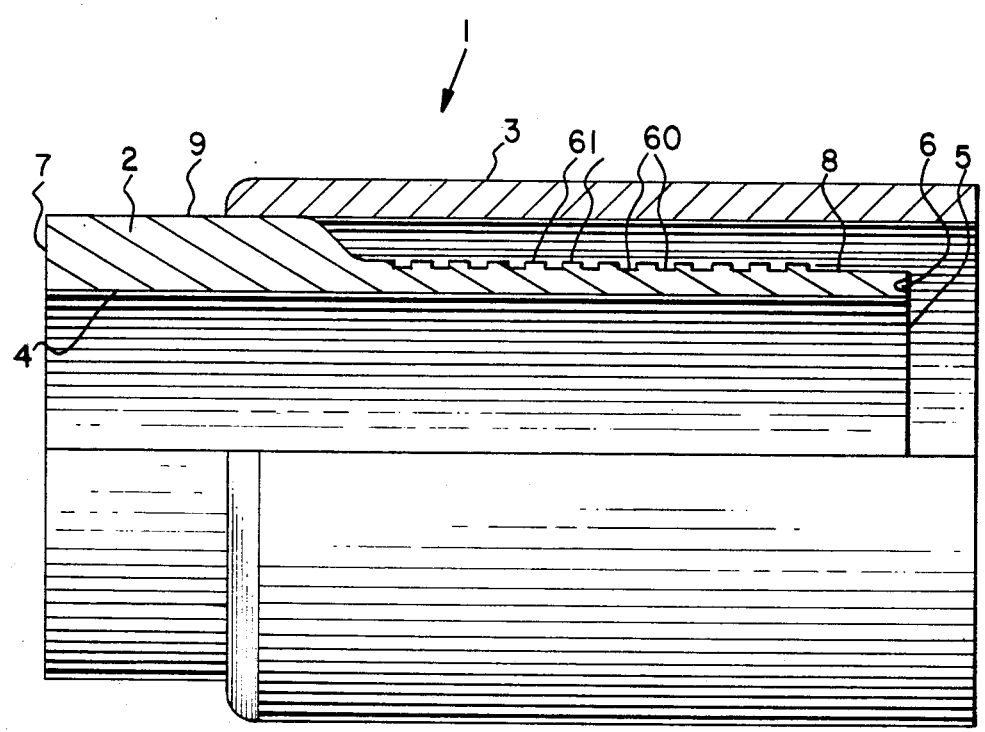
FIG. 1 is a partial cut-away sectional view axially through a coupling of the invention.
Figure 2:
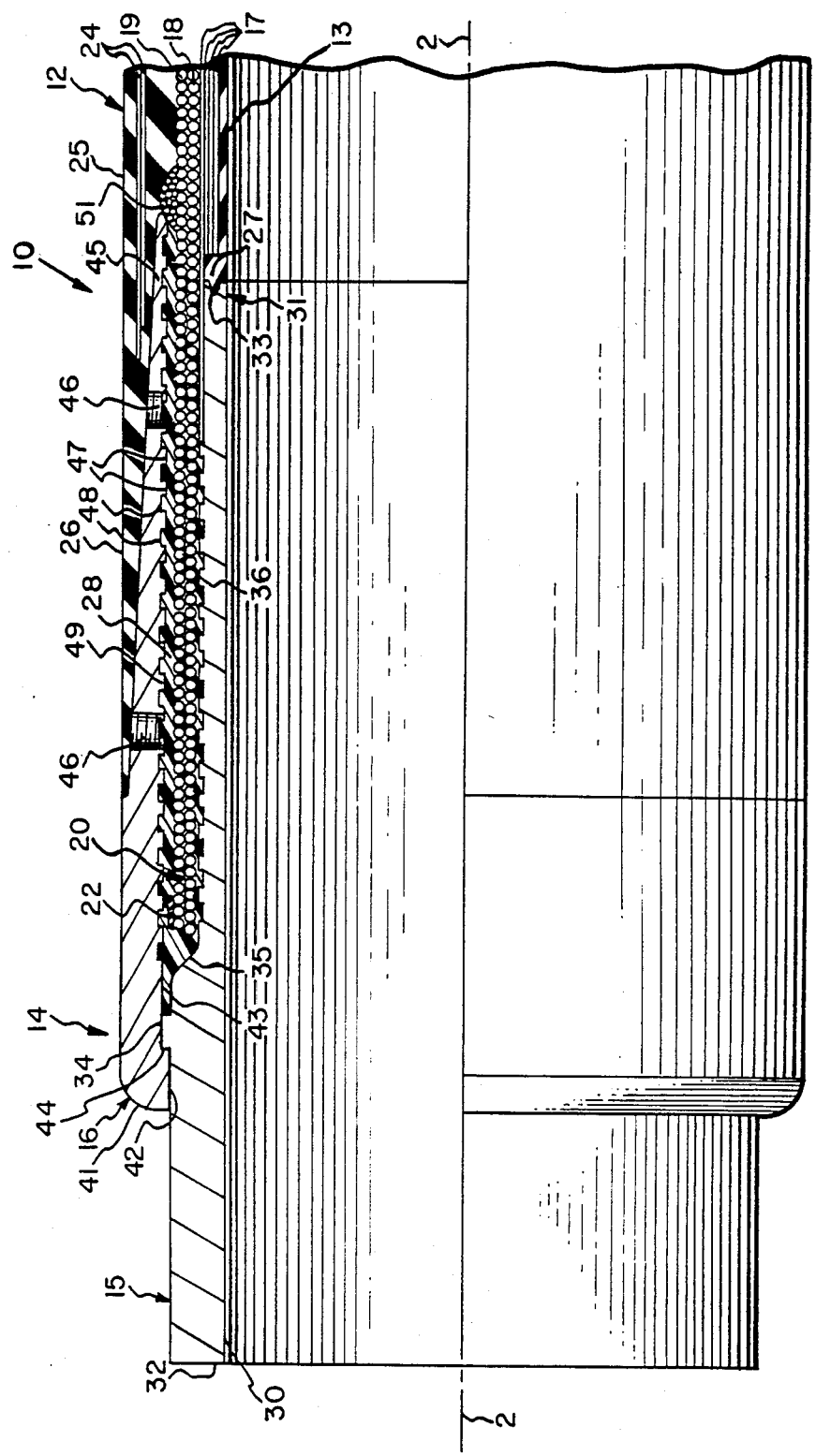

FIG. 1 shows the coupling 1 which is a two part fitting. The stem 2 and the ferrule 3 are fabricated from suitable rigid metal or high performance reinforced plastic. The stem 2 is a generally cylindrical body with a smooth circular bore 4 extending therethrough, having a smaller outside diameter end 5 containing an annular recess 6 therein and a large diameter end 7. The smaller diameter end 5 has adjacent thereto a smaller diameter portion 8 of the outer surface of the stem. The larger diameter end 7 similarily has a larger diameter portion 9 of the outer surface of the stem adjacent thereto. The smaller diameter portion 8 of the stem includes over a substantial portion of its outer surface a series of lands 61 and grooves 60 which are necessary for fitting retention when a hose is coupled with the coupling 1. The ferrule 3 is a rigid generally tubular sleeve having an inner diameter equal to the diameter of the larger diameter end 5 of the stem 2 and longer in axial length than the smaller diameter portion 8 of the stem. The ferrule 3 is slidably mounted over the larger diameter end 7 of the stem 2 and coaxially positioned such that at least some portion is overlapping and in contact with the larger diameter portion 9 of the stem and the rest extends over the full length of the smaller diameter portion 8 of the stem. It is desired that the coupling be adapted to provide a means to overlap the cover of a hose onto the ferrule to accomplish a smooth transition onto the coupling, the outer surface of the ferrule may be gradually tapered toward the end which will abut the hose.

Figure 2:
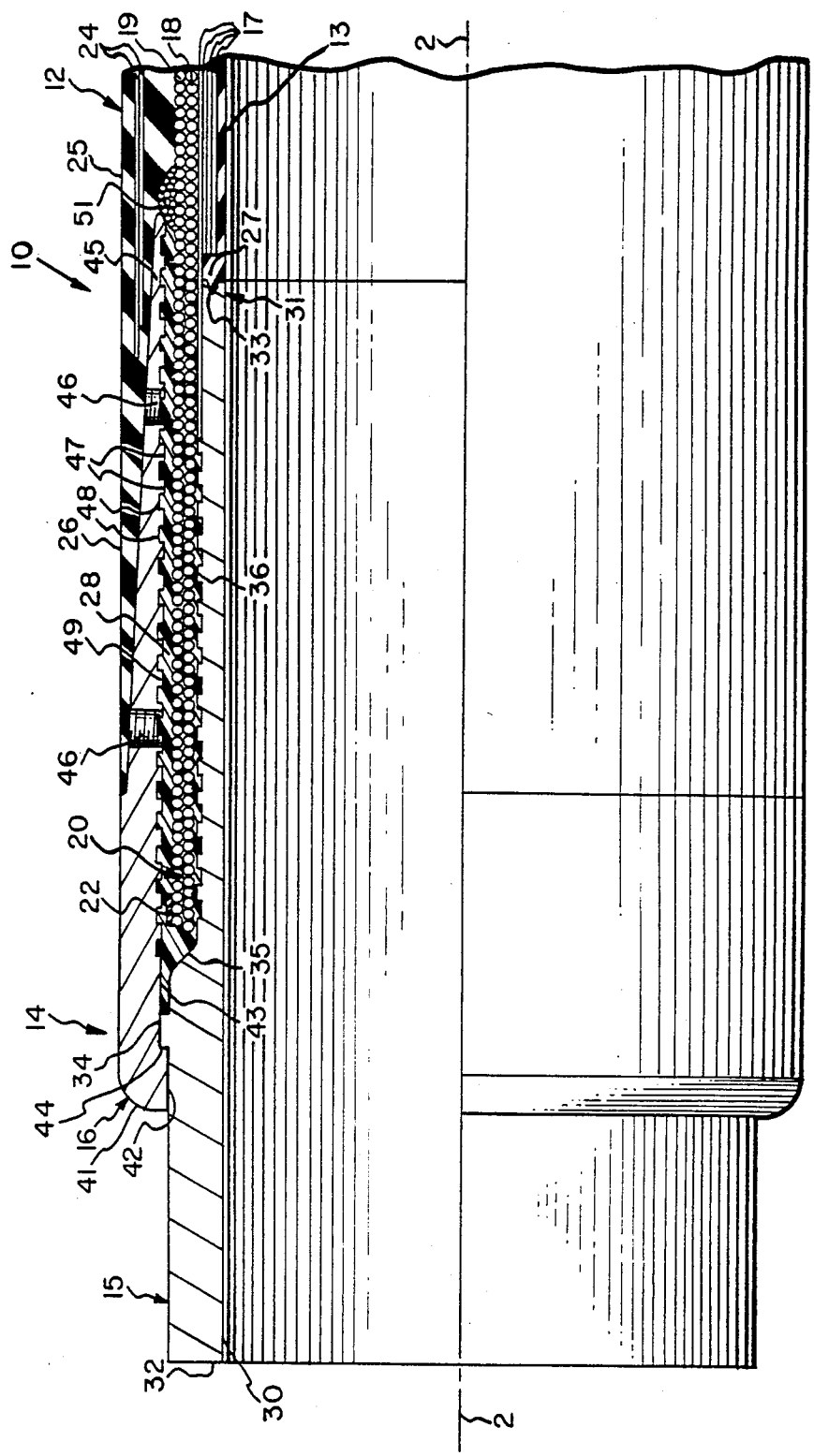
FIG. 2 is a partial cut-away sectional view axially through a hose and coupling assembly which depicts a preferred embodiment of the invention.

Referring to FIG. 2 there is shown a preferred hose and coupling assembly 10 having a longitudinal axis depicted by line 2—2. When the term coaxial is used herein, it will mean that the particular feature is coaxial with respect to this longitudinal axis 2—2. The hose 12 includes an elastomeric tube 13 which forms its radially innermost surface. Overlying the tube 13 may be multiple plies 17 of textile reinforcement embedded in elastomeric material. Overlying the tube 13 and textile ply 17 are at least two layers 18, 19 of main reinforcing elements such as steel or aromatic polyamide cables 20. Each of the cables 20 is typically comprised of a plurality of filaments of high tensile steel wire, or aromatic polyamide polymer. Cables 20 are helically wound about the tube 13 and the reinforcement plies 17. The cables 20 of the radially innermost layer 18 are helically wound in an opposite sense relative to those of the adjacent radially outermost layer 19 of steel cables 20. Overlying the steel cables 20, there may optionally be one or more layers of outer fabric plies 24 which are embedded in an elastomeric material. Overlying the outer fabric plies 24 is a cover layer 25 of elastomeric material which forms the outer surface 26 of the hose 12. It is desirable to immobilize the steel cables 20 of the reinforcement layers 18 and 19 to assure that there is no flaring outwards during coupling operations. A cable holddown strip 22 is shown in FIG. 2 and is useful for the purpose of maintaining the compact cylindrical structure of the reinforcement elements. Other means such as circumferential wire wrapping may be used as a hold down strip as well.

The coupling 14 is a preferred embodiment of the coupling 1 of FIG. 1. Coupling 14 is a two part fitting including a stem 15 and a ferrule 16. The stem 15 and ferrule 16 are machined separately from pieces of suitable rigid material, preferably steel. The stem 15 includes a bore 30 which is circular in cross-section and has an axis 2—2. The stem 15 has a hose engaging end 31 and a nipple end 32. The hose engaging end 31 includes an annular recess 33 having a mean diameter slightly greater than said stem bore 30. The outside diameter of stem 15 at the nipple end 32 is greater than the diameter at the hose engaging end 31. Preferably the difference between the diameters is approximately equal to two times the radial thickness of the reinforcing element layers 18, 19. A ferrule engaging rib 34 is provided on the outer surface of stem 15. The ferrule engaging rib 34 is spaced axially away from the nipple end 32 and is in the form of a raised annular ring surrounding the stem. The edge of the rib facing the nipple end 32 is preferably a flat facing surface. Rib 34 may be machined as an integral part of the stem 15 as illustrated in FIG. 2. The rib may also be formed by alternate means (not shown) such as a snap ring which fits into an annular groove formed in the outer surface of the stem 15. The shoulder 35 between the larger diameter nipple end of stem 15 and smaller diameter hose engaging end 31 is shown for illustrative purposes in FIG. 2 as being a tapered shoulder. This shoulder 35 may be any suitable configuration, including a squared-off shoulder or a stairstep shoulder.

The ferrule 16 is a generally cylindrical body having a coaxial bore 42 with a diameter equal to the diameter of stem 15 at the point where rib 34 rises from the main body of the stem. The ferrule 16 has a stem engaging end 41 and a tapered end 45. Ferrule 16 also has a coaxial counter-bore 43 with a diameter equal to the diameter of the ferrule engaging radial rib 34 of the stem 15. The maximum extent of the counter-bore 43 is defined by a rib engaging shoulder 44 which engages the radial rib 34 when the ferrule 16 is slidably positioned on stem 15. The outside diameter of the ferrule 16 being a gradual outside taper toward the tapered end 45 which is opposite the stem engaging end 41. The ferrule 16 may include at least one port 46 which is a bore extending radially through the ferrule 16.

The outer surface of the stem extending from the shoulder 35 toward the hose engaging end of the stem 31 and the innermost surface of the ferrule counter-bore 43 is configured, for example, with a plurality of lands 47 and grooves 48 to provide secure anchorage of the coupling to the anchoring material such as epoxy resin. These surfaces may also be textured or treated for improved adhesion. FIG. 2 illustrates the preferred embodiment of land and groove which is a continuous spiral stem thread 36 and a continuous spiral ferrule thread 49, where both threads have a rectangular bottom.

The hose 12 and coupling 14 may be combined to form a hose and coupling assembly 10 having superior end pull and end sealing capabilities. The multiple layers of hose reinforcing elements 18, 19 are positioned between the stem portion 15 and the ferrule portion 16 of the coupling 14. The reinforcing layers 18 and 19 have a maximum extent at the point at which the rib engaging shoulder 44 of the ferrule is in contact with the ferrule engaging radial rib 34 of the stem portion. FIG. 2 shows the preferred embodiment of the invention wherein the reinforcing layers 18, 19 terminate short of the shoulder 35 of the stem portion. The recess 33 in the hose engaging end of stem 31 is filled with an elastomeric sealing material 27 which is preferably of the same composition as the tube 13 or at least is capable of being covulcanized into an integral cured unit. The elastomeric sealing material 27 may be an extension of uncured tube 13 which has been folded on itself or it may be a separately applied body of uncured elastomer. The textile plies 17 extend to a point near recess 33, but not adjacent thereto. The elastomeric sealing material 27 lies between the textile plies 17 and the hose engaging end of stem 31. FIG. 2 shows a preferred embodiment in which at least one fabric reinforcing ply 17 extends axially past the end of stem 15. This preferred configuration assures that in the presence of twisting motion between the hose and the coupling that a firm end seal is maintained through the mechanical bonding afforded by the textile reinforcement ply 17 extending through the maximum strain area which would be centered at the hose engaging end 31 of stem 15. The reinforcing elements 18 and 19 are embedded in an anchoring matrix 28. The anchoring matrix 28 completely surrounds the steel cables 20 and extends in the preferred embodiment shown in FIG. 1 into the stem threads 36 and ferrule threads 49. A preferred anchoring material is an epoxy resin.

A hose and coupling assembly 10 according to this invention may be made as follows: An uncured hose preform is fabricated on a cylindrical mandrel (not shown). The preform includes a radially innermost tube of uncured elastomeric material which will become the tube 13 of the completed hose 12, rubberized fabric reinforcing plies 17 wrapped about the uncured tube and at least two layers 18, 19 of main reinforcing elements composed of steel cables 20. The recess 33 is then filled with an uncured elastomeric sealing 27. This step may be accomplished by wrapping an uncured band of rubber over the mandrel such that the recess is filled. The cured band must be capable of forming an integral bond with the tube 13 during the subsequent curing step. An alternative method of filling the recess may be used. The uncured elastomer of the innerlayer of the hose preform may also be extended beyond the end of the fabric reinforcing layers 17 and rolled upon itself so as to form a volume of uncured elastomer sufficient to fill the recess 33 in stem 15 and form the elastomeric sealing material 27. The uncured hose preform is placed in end-wise contact with stem 15 such that the extension of the radially innermost elastomeric tube of the preform which extends beyond the end of the textile reinforcement plies 17 is set into the recess 33 of the stem 15. Axial pressure sufficient to force the extension of the elastomeric material of the innermost tube 13 to fill the recess is applied between the hose and the stem.

Once the uncured hose preform is in positive contact with stem 15, the main reinforcing elements such as steel cables 20 are extended onto the outer surface of the stem in such a manner that there is no substantial change in the mean diameter of the layers 18 and 19 as they are extended from the hose onto the stem. The steel cables 20 are then helically wound onto the stem until the helical layers of steel cable have extended at least to the juncture 35 in the stem 15. The steel cables are then securely bound by a hold-down means such as the cable hold-down strip 22 shown in FIG. 2. The portions of the steel cables 20 which extend onto the shoulder area are then cut off in order to terminate the steel cable layer just short of the shoulder 35. Any cables extending into the shoulder area and onto the larger diameter portion of the stem are removed. The ferrule 16 is then slid onto the stem portion from the nipple end 32 such that the tapered end 45 of the ferrule is extending over the reinforcing elements 18 and 19. The ferrule is slid onto the stem until the rib engaging shoulder 44 is firmly in contact with the ferrule engaging radial rib 34 of the stem. A suitable means for sealing is set in place at the tapered end of the ferrule so as to occlude the passage of any fluid and form a void annular area of space between the ferrule 16 and the hose preform. FIG. 2 illustrates one suitable means for sealing which is a dam 51 which is composed of rubber covered fabric strips which are wrapped around the circumference of the assembly to form the annular space or void. The anchoring material 28 is then introduced through at least one port 46 into the annular void space between the axial counter-bore 43 of the ferrule and the exterior surface of the stem extending from the radial rib 34 toward the hose engaging end 31 of the stem. It should be noted here that when a liquid anchoring material 28 such as an epoxy resin is utilized, it migrates between the individual steel cables and completely fills the void area between the ferrule and the stem through to the dam 51. The anchoring material 28 solidifies and thus anchors the steel cables 20 to the coupling 14. Thereafter the radially outer most elastomeric cover layer 26 is applied over the complete exterior of the hose and is extended onto the outer surface of the ferrule 16 to completely cover the tapered end 45 of the ferrule 16. The cover layer 26 extends partly over the coupling 14 in order to provide a uniform diameter assembly so that snagging of that assembly in service is minimized. After completion of assembly of the uncured hose and curing or solidification of the anchoring material such as epoxy resin, the hose and coupling assembly 10 is cured by applying heat and pressure in a conventional manner to effect vulcanization of the elastomeric components of the hose preform and to securely bond the elastomeric sealing material 27 to the hose tube 13 and to the adjacent surfaces of coupling 14.

In many working environments there may be applied a twisting moment to the hose and coupling combination which would transmit considerable shear stress to the interface between the hose engaging end 31 of stem 15 and the elastomeric sealing material 27 adhered thereto. Any dislocation of the sealing material may cause leakage between the coupling and the hose. The portion of the stem which contacts this elastomeric material 27 may be cleaned by sand or bead blasting prior to assembly. A known adhesion promoter such as Chemlock TM 205 and 220 in combination, available from Hughson Chemical Corporation may also be utilized as is well known to enhance the adhesion at this critical end seal interface. The building method may preferably include the additional step that at least one textile fabric reinforcement layer 17 be extended past the hose engaging end 31 onto the main body of the stem. This extension of the fabric reinforcement layer 17 through this critical stress interface provides a means for dissipating the shear stress of such twisting away from the end seal area of the hose. The configuration of the recess 33 is shown as a generally U-shaped configuration, but it can be machined to many configurations to assure a good end seal as is taught in U.S. Pat. No. 4,353,581.

The elastomers useful in the tube, cover and elastomeric sealing material, are any of the well known rubber polymers including natural rubber, styrene-butadiene rubber, acrylonitrile-butadiene rubbers, polychloroprene, polyisoprene, ethylene-propylene diene, polybutadiene. The preferred embodiment shown in FIG. 2 was made with an innermost tube and elastomeric sealing material of acrylonitrile-butadiene copolymer with carbon black loading. The cover was a carboxylated acrylonitrile-butadiene compound with carbon black and silica loading.

An 8 inch (20 cm) internal diameter 25 foot (7.6 m) jetting hose and coupling assembly was made according to the method described conforming to the embodiment shown in FIG. 2. The nipple end of the coupling was welded to a flange and connected to a compressor. The hose was pressurized to 2500 psi (17.4 MPa). The pressurized hose was subjected to an end loading (axial pull) of 120,000 foot pounds (534 kN). Despite a lengthening of 25 inches (64 cm), the hose-coupling assembly maintained the internal pressure during the end loading test pull indicating that the hose-to-coupling seal was intact. The internal pressure rose to 4500 psi (31 MPa) at 120,000 foot pounds (534 kN) of end pull due primarily to volumetric changes in the hose. The hose coupling assembly of this invention was found to be capable of withstanding internal pressurization in excess of 10,000 psi (69 MPa).

While certain representative embodiments and details have been shown for the purposes of illustrating the invention, it will be apparent to those skilled in the art that various changes and modifications may be made therein without departing from the scope of the invention.

I claim:

1. A rigid two part coupling for flexible hose comprising a stem and a ferrule, said stem being of generally cylindrical shape and having a smooth circular bore therethrough, said stem having an outer surface composed of a larger outside diameter portion terminating in a larger diameter end and a smaller outside diameter portion terminating in a smaller diameter end containing an annular recess therein, said smaller diameter portion containing a series of lands and grooves in the outer surface thereof, said ferrule being of generally tubular shape having an inside diameter equal to the outside diameter of the larger diameter portion of the stem and having a length greater than the length of the smaller diameter portion of the stem, said ferrule being coaxially positioned around said stem to overlie the entire smaller diameter portion of the stem and to extend over a portion of the larger diameter portion of the stem.

2. A rigid coupling according to claim 1 wherein said ferrule includes a gradually tapered outer surface portion.

3. A rigid coupling for hose having a stem and a ferrule, said stem having a hose engaging end and a nipple end, a coaxial stem bore therethrough, a ferrule engaging radial rib spaced axially away from the nipple end, an annular recess in the hose engaging end of said stem having a mean diameter slightly greater then said coaxial stem bore, said stem having a smaller outside diameter at the hose engaging end than at the nipple end, said ferrule having a stem engaging end, a tapered end, a coaxial bore extending therethrough, a coaxial counterbore extending from the tapered end terminating in a rib engaging shoulder which defines the maximum extent of the coaxial counterbore, said coaxial bore having a outside diameter substantially equal to the diameter of the nipple end of said stem, said coaxial counterbore having a diameter substantially equal to the outside diameter of said ferrule engaging radial rib of said stem, said ferrule being engaged with the stem by sliding the ferrule over the stem from the nipple end of the stem until said rib engaging shoulder contacts the ferrule engaging radial rib of said stem.

4. A coupling according to claim 3 wherein the coaxial counterbore of the ferrule and the smaller outside diameter portion of the stem include coarse rectangular bottom threads cut therein to assist coupling retention.

5. A coupling according to claim 4 wherein the coaxial counterbore and the smaller outside diameter portion of the stem have a coarse textured surface to improve coupling retention.

6. In combination, a reinforced hose and coupling assembly comprising:
 (a) a hose including a radially innermost elastomeric tube at least two layers of reinforcing elements and an elastomeric cover layer;
 (b) a rigid coupling for hose having a stem and a ferrule, said stem having a hose engaging end and a nipple end, a coaxial stem bore therethrough, a ferrule engaging radial rib spaced axially away from the nipple end, said stem having a smaller outside diameter at the hose engaging end than at the nipple end, said ferrule having a stem engaging end, a tapered end, a coaxial bore extending therethrough and a coaxial counterbore extending from the tapered end and terminating in a rib engaging shoulder which defines the maximum extent of the coaxial counterbore, said coaxial bore having a diameter substantially equal to the outside diameter of the nipple end of said stem, said coaxial counterbore having a diameter substantially equal to the outside diameter of said ferrule engaging radial rib of said stem, said ferrule being positioned over the stem such that the rib engaging shoulder contacts the ferrule engaging radial rib of said stem;

(c) said reinforcing elements extending between the stem and the ferrule and not beyond said ferrule engaging radial rib, said reinforcing elements being embedded in an anchoring matrix material disposed between said stem and ferrule portions of the coupling.

7. The combination of claim 6 wherein said hose engaging end of the stem includes an annular recess having a mean diameter slightly greater than said coaxial stem bore.

8. The combination of claim 7 wherein said hose includes an elastomeric sealing material which is coextensive with said innermost elastomeric tube, and completely fills and bonds to said annular recess.

9. The combination of claim 8 wherein said elastomeric sealing material is an extension of said innermost elastomeric tube.

10. The combination of claim 6 wherein said hose further comprises a plurality of textile plies, at least one of said textile plies extending from the hose over the stem, and positioned radially inwardly of the reinforcing layers.

11. The combination of claim 6 wherein said reinforcing layers are composed of helically wound steel cables.

12. The combination of claim 6 wherein said anchoring matrix material is an epoxy resin.

13. A combination of claim 6 wherein the coaxial counterbore of the ferrule and the outer surface of the smaller diameter portion of the stem include coarse rectangular bottom threads cut therein to improve coupling retention.

14. A combination of claim 8 wherein the annular recess in the hose engaging end of the stem has a layer of adhesion promoter contacting the elastomeric sealing material.

15. A combination of claim 6 wherein the elastomeric cover layer extends over the tapered end of the ferrule and is securely adhered thereto.

16. A method of coupling a hose to a coupling, said hose having an innermost tube of elastomeric material, a plurality of textile plies, a plurality of reinforcing element layers and an outermost elastomeric cover, said coupling having a stem and a ferrule, said stem having a smaller diameter end and a larger diameter end, said smaller diameter end containing an annular recess therein, said method comprising the steps of:

(a) placing an uncured hose preform in end-wise contact with said smaller diameter end of the stem, said preform including a radially innermost tube of uncured elastomeric material, a said plurality of textile plies overlying said tube and a plurality of reinforcing element layers;

(b) filling the annular recess in the smaller diameter end of the stem with an elastomeric sealing material;

(c) extending said layers of reinforcing elements onto the stem to completely cover said smaller diameter portion of said stem;

(d) binding down said reinforcing elements around said smaller diameter portion of said stem;

(e) trimming said reinforcing elements such that no reinforcing element extends beyond said smaller diameter portion of said stem;

(f) sliding said ferrule onto said stem over said reinforcing elements;

(g) providing a means for sealing between said reinforcing elements and said ferrule to form an annular space therebetween;

(h) filling the annular space with an anchoring material which fixedly embeds said reinforcing elements of the hose therein;

(i) applying of the outermost elastomeric cover over a substantial portion of said ferrule to form a hose and coupling assembly; and (j) applying heat and pressure to the hose and coupling assembly to cure the hose and securely bond the elastomeric sealing material to the annular recess in said stem.

17. A method of coupling a hose according to claim 16 further comprising the steps of extending the innermost tube of the hose preform axially beyond the textile plies to form the elastomeric sealing material; then providing axial pressure between said hose preform and said stem to force the portion of the tube extending beyond the textile plies into said annular recess, thereby filling the annular recess in the smaller diameter end of the stem with the elastomeric sealing material.

18. A method of coupling a hose according to claim 16 further comprising the step of extending at least one outermost ply of the textile plies from the hose preform over the smaller diameter end of the stem before extending the layers of reinforcing elements onto the stem and over said one outermost ply.

19. A method of coupling a hose according to claim 16 further comprising the step of applying to portions of the stem and the ferrule a coating of adhesion promoter prior to placing the uncured hose preform in endwise contact with the stem, in order to improve the adhesion of the innermost tube and the elastomeric sealing material to the stem and the elastomeric cover to the ferrule.

20. A method of coupling a hose according to claim 16 wherein said reinforcing layers are composed of helically wound steel cables and said step of extending the layers of reinforcing element consists of continuing to helically wind the steel cable onto said smaller diameter portion of said stem.

* * * * *